(12) United States Patent
Sabanayagam et al.

(10) Patent No.: US 10,949,334 B2
(45) Date of Patent: Mar. 16, 2021

(54) SYSTEM AND A METHOD FOR AUTOMATED UNIT TEST GENERATION

(71) Applicant: Cognizant Technology Solutions India Pvt. Ltd., Chennai (IN)

(72) Inventors: Sakthivel Sabanayagam, Hyderabad (IN); Saroj Pradhan, Kolkata (IN); Srujana Korukoppula, Hyderabad (IN); Angusamy Vimal Kumar, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 201 days.

(21) Appl. No.: 16/248,115

(22) Filed: Jan. 15, 2019

(65) Prior Publication Data
US 2020/0167268 A1 May 28, 2020

(30) Foreign Application Priority Data
Nov. 26, 2018 (IN) .............................. 201841044428

(51) Int. Cl.
*G06F 11/36* (2006.01)
(52) U.S. Cl.
CPC ...... *G06F 11/3684* (2013.01); *G06F 11/3608* (2013.01); *G06F 11/3676* (2013.01)
(58) Field of Classification Search
CPC .............. G06F 11/3684; G06F 11/3608; G06F 11/3676
See application file for complete search history.

(56) References Cited

U.S. PATENT DOCUMENTS

| 8,856,764 B2 | 10/2014 | Pistoia |
| 2007/0033442 A1 | 2/2007 | Tillmann |

(Continued)

FOREIGN PATENT DOCUMENTS

| CN | 105335281 A | 2/2016 | |
| EP | 2919132 A1 * | 9/2015 | .......... G06F 11/3668 |

OTHER PUBLICATIONS

Andreas Fuchs et al., "Improving Integration Testing of Web Service by Propagating Symbolic Constraint Test Artifacts Spanning Multiple Software Projects" (http://ksiresearchorg.ipage.com/seke/seke18paper/seke18paper_128.pdt), SEKE 2018: 647-646.

*Primary Examiner* — Doon Y Chow
*Assistant Examiner* — Timothy P Duncan
(74) *Attorney, Agent, or Firm* — Cantor Colburn LLP

(57) ABSTRACT

A system and a method for automating unit test case including generating a codebase extract by analysing an application source code, identifying one or more potential executable paths within a selected class or method based on an analysis of the codebase extract, executing one or more statements associated with each of the one or more potential paths using a symbolic execution technique and identifying one or more calls to external dependencies associated with the respective paths, and subsequently, a hint for spying and mocking respective external dependencies is generated, as a by-product of symbolic execution on identification of the external dependencies, whereby each hint is updated with respective ideal return value, and a unit test case for testing a selected class or method is generated by processing the hints with test data and an exclusion list.

23 Claims, 11 Drawing Sheets

(56) References Cited

U.S. PATENT DOCUMENTS

| | | |
|---|---|---|
| 2011/0239194 A1 | 9/2011 | Braude |
| 2015/0089296 A1* | 3/2015 | Dermler .............. G06F 11/2273 |
| | | 714/38.1 |
| 2015/0135158 A1* | 5/2015 | Tenev ................. G06F 11/3684 |
| | | 717/101 |
| 2016/0070640 A1 | 3/2016 | Clark |
| 2017/0132116 A1* | 5/2017 | Lopian ................ G06F 11/3684 |
| 2018/0032425 A1* | 2/2018 | Abadi ................. G06F 11/3696 |
| 2018/0129592 A1* | 5/2018 | Li ....................... G06F 11/3684 |
| 2020/0019494 A1* | 1/2020 | Kwon .................. G06F 16/242 |

\* cited by examiner

```
1  public class JdbcVisitRepositoryImpl implements VisitRepository
2  {
3      public void save(Visit visit, DataSource dataSource) throws DataAccessException
4      {
5          SimpleJdbcInsert insertVisit = new SimpleJdbcInsert(dataSource);
6          if (visit.isNew())
7          {
8              Number newKey = insertVisit.executeAndReturnKey(visit);
9              visit.setId(newKey.intValue());
10         }
11         else
12         {
13             throw new UnsupportedOperationException("Visit update not supported");
14         }
15     }
16 }
```

FIG. 3A

```xml
<variable varname="insertVisit" symbol="s_10" type="SimpleJdbcInsert" isnull="false">
    <source actualtype="SimpleJdbcInsert" scopetype="SimpleJdbcInsert" objectname="rle5y5scp3ga"
        member="SimpleJdbcInsert(DataSource dataSource)" isselectedclass="false" isconstructor="true"/>
</variable>
<variable varname="ep_@TH311_5_ry4uterauzpr_UnknownReturn" symbol="s_11" type="boolean" isnull="false"
    value="True">
    <source actualtype="org.springframework.samples.petclinic.model.BaseEntity" scopetype
        ="org.springframework.samples.petclinic.model.Visit"
        objectname="visit" objectsymbol="s_3" member="isNew() : boolean" isselectedclass="false"
    isconstructor="false"/>
</variable>
<variable varname="newKey" symbol="s_14" type="Number" isnull="false">
    <source actualtype="SimpleJdbcInsert" scopetype="SimpleJdbcInsert" objectname="insertVisit"
objectsymbol="s_10"
    member="executeAndReturnKey(org.springframework.samples.petclinic.model.Visit visit)" isselectedclass="false"
        isconstructor="fale"/>
</variable>
<variable varname="ep_@TH311_rgg32y5yobad_UnknownReturn" symbol="s_15" type="[UNKNOWN]" isnull="false">
    <source actualtype="Number" scopetype="Number" objectname="newKey" objectsymbol="s_14" member="intValue()"
    isselectedclass="false" isconstructor="false"/>
</variable>
<variable varname="ep_@TH311_5_r5azokomofvv_UnknownReturn" symbol="s_16" type="void" isnull="false">
    <source actualtype="org.springframework.samples.petclinic.model.BaseEntity" scopetype
        ="org.springframework.samples.petclinic.model.BaseEntity"
        scopetype="org.springframework.samples.petclinic.model.Visit"
        objectname="visit" objectsymbol="s_3" member="setId(Integer id) : void" isselectedclass="false"
            isconstructor="false"/>
</variable>
```

FIG. 3B

```
public void saveTest0() throws Throwable
{
    JdbcVisitRepositoryImpl jdbcVisitRepositoryImpl0 = new JdbcVisitRepositoryImpl();

Visit visit0 = mock(Visit.class);
    DataSource datasource1 = mock(DataSource.class);
    SimpleJdbcInsert simpleJdbcInsert3 = PowerMockito.mock(SimpleJdbcInsert.class);
    PowerMockito.whenNew(SimpleJdbcInsert.class).withAnyArguments().thenReturn(simpleJdbcInsert3);

boolean boolean0 = true;
    doReturn(boolean0).when(visit0).isNew();

Number number0 = mock(Number.class);
    doReturn(number0).when(simpleJdbcInsert3).executeAndReturnKey(
        any(org.springframework.samples.petclinic.model.Visit.class));
    int int0 = 0;
    doReturn(int0).when(number0).intValue();
    jdbcVisitRepositoryImpl0.save(visit0, dataSource1);

verify(visit0,times(1)).setId(anyInt());
}
```

Unit Test Code Generated Using Hints

FIG. 3C

```
public void saveTest() throws Throwable
{
    Visit visit0 = new Visit();
    visit0.setId(null);
    DataSource dataSource1 = new DataSource();
    JdbcVisitRepositoryImpl jdbcVisitRepositoryImpl0 = new JdbcVisitRepositoryImpl();
    JdbcVisitRepositoryImpl0.save(visit0, dataSource1);
}
```

Unit Test Code Generated Without Using Hints

CONT. FIG. 3C

```
public void save(Visit visit, DataSource dataSource) throws DataAccessException {
    SimpleJdbcInsert insertVisit = new SimpleJdbcInsert(dataSource);
    if (visit.isNew()) {
        Number newKey = insertVisit.executeAndReturnKey((visit));
        visit.setId(newKey.intValue());
    } else {
        throw new UnsupportedOperationException("Visit update not supported");
    }
}
```

Code Coverage With Hints

FIG. 3D

```
public void save(Visit visit, DataSource dataSource) throws DataAccessException {
    SimpleJdbcInsert insertVisit = new SimpleJdbcInsert(dataSource);
    if (visit.isNew()) {
        Number newKey = insertVisit.executeAndReturnKey((visit));
        visit.setId(newKey.intValue());
    } else {
        throw new UnsupportedOperationException("Visit update not supported");
    }
}
```

Code Coverage Without Hints

CONTI. FIG. 3D

SYSTEM AND A METHOD FOR AUTOMATED UNIT TEST GENERATION

CROSS REFERENCE TO RELATED APPLICATION

This application is related to and claims the benefit of Indian Patent Application Number 201841044428 filed on Nov. 26, 2018, the contents of which are herein incorporated by reference in their entirety.

FIELD OF THE INVENTION

The present invention relates generally to the field of software development and testing. More particularly, the present invention relates to a system and a method for automated unit test case generation for testing application code.

BACKGROUND OF THE INVENTION

Symbolic execution based test case generation is in existence since 1980's. Existing tools for generation of unit test cases use a combination of Path solving, symbolic execution and constraint solving techniques for automating formulation of a branch covering input and output data for unit tests. However, such test cases do not anticipate and handle external dependencies such as calls to external libraries, database queries, calls to web service etc., which are very common in most application codes and thereby result in failure of unit test.

Existing tools are unable to handle calls to external libraries within the application code, and require a spying and faking arrangement from end users to get the unit test cases working. In particular, during test case generation these tools are unable to access source code associated with external dependencies for execution and require human intervention. Additionally, the code coverage metrics are poor when external library calls are encountered.

In light of the above mentioned drawbacks, there is a need for a system and a method for automating unit test case generation. There is a need for a system and method for handling calls to external dependencies such as calls to external libraries, calls to web services etc. without human intervention. There is a need for a system and a method which automatically anticipates and handles calls to external dependencies for which the associated source-code are not available for symbolic or concolic execution. Further, there is a need for a system and a method which provides high code coverage. Yet further, there is a need for a system and a method which is cost effective and provides superior performance.

SUMMARY OF THE INVENTION

In various embodiments of the present invention, a computer implemented method for automating unit test case generation for one or more methods associated with an application source code. The method is implemented by a processor executing program instructions stored in a memory. The method comprises identifying, by the processor, one or more potential executable paths associated with a selected method by analysing a code base extract using a path solving technique. The method further comprises, identifying, by the processor, one or more calls to external dependencies associated with each of the one or more potential executable paths using a symbolic execution technique. Further, the method comprises generating, by the processor, one or more hints for the identified one or more calls to external dependencies, wherein each hint is representative of call information associated with the external dependencies. Furthermore, the method comprises updating, by the processor, the one or more hints with accurate implementations of an object type in each of the one or more hints. The accurate implementation of each object type is identified based on determination of a predefined category associated with the object type. Yet further, the method comprises updating, by the processor, each of the one or more hints with respective ideal return value. The ideal return value of each of the one or more calls to external dependencies is determined based on an aggregated conditional expression associated with respective paths using one or more constraint solving techniques. Finally, the method comprises generating, by the processor, a unit test code for the selected method by processing the one or more hints with a test data and an exclusion list.

In various embodiments of the present invention, a system for automating unit test case generation for one or more methods associated with an application source code is provided. The system interfaces with an application subsystem comprising the application source code. The system comprises a memory storing program instructions; a processor configured to execute program instructions stored in the memory; and a unit test generation engine in communication with the processor. The system is configured to identify one or more potential executable paths associated with a selected method by analysing a code base extract using a path solving technique. Further, the system is configured to identify one or more calls to external dependencies associated with each of the one or more potential executable paths using a symbolic execution technique. Furthermore, the system generates one or more hints for the identified one or more calls to external dependencies. Each hint is representative of call information associated with the external dependencies. Yet further, the system is configured to update one or more hints with respective accurate implementations of an object type in each of the one or more hints, wherein the accurate implementation of each object type is identified based on determination of a predefined category associated with the object type. Yet further, the system updates each of the one or more hints with respective ideal return value. The ideal return value of each of the one or more calls to external dependencies is determined based on an aggregated conditional expression associated with respective paths using one or more constraint solving techniques. Finally, the system generates a unit test code for the selected method by processing the one or more hints with a test data and an exclusion list.

In various embodiments of the present invention, a computer program product is provided. The computer program product comprises a non-transitory computer-readable medium having computer-readable program code stored thereon, the computer-readable program code comprising instructions that, when executed by a processor, cause the processor to identify one or more potential executable paths associated with a selected method by analysing a code base extract using a path solving technique. Further, one or more calls to external dependencies associated with each of the one or more potential executable paths are identified using a symbolic execution technique. Furthermore, one or more hints for the identified one or more calls to external dependencies are generated, wherein each hint is representative of call information associated with the external dependencies. Yet further, one or more hints are updated with accurate implementations of an object type in each of the one or more hints. The accurate implementation of each object type is identified based on determination of a predefined category associated with the object type. Yet further, each of the one or more hints are updated with respective ideal return value. The ideal return value of each of the one or more calls to external dependencies is determined based on an aggregated conditional expression associated with respective paths using one or more constraint solving techniques. Finally, a unit test code for the selected method is generated by processing the one or more hints with a test data and an exclusion list.

BRIEF DESCRIPTION OF THE ACCOMPANYING DRAWINGS

The present invention is described by way of embodiments illustrated in the accompanying drawings wherein:

FIG. 3A is an example of an application source code, in accordance with various embodiments of the present invention;

FIG. 3B is an example of one or more hints generated for the application source code of FIG. 3A, in accordance with various embodiments of the present invention;

FIG. 3C shows a comparison between a unit test generated in accordance with various embodiments of the present invention and a unit test generated using conventional methods;

FIG. 3D shows a comparison between code coverage achieved using the unit test generated in accordance with various embodiments of the present invention and code coverage achieved using unit test generated in accordance with conventional methods.

DETAILED DESCRIPTION OF THE INVENTION

The present invention discloses a system and a method for automating unit test case generation. In particular, the present invention provides generating a codebase extract by analysing an application source code. The codebase extract includes a class dependency graph and one or more abstract syntax graphs associated with the application source code. The present invention, further provides for identifying one or more potential executable paths within a selected class or method based on an analysis of the codebase extract. Further, the present invention, provides for executing one or more statements associated with each of the one or more potential paths using a symbolic execution technique and identifying one or more calls to external dependencies associated with the respective paths. The one or more calls to external dependencies may include, but are not limited to, calls to external libraries, database queries, calls to web service etc. Subsequently, a hint for spying and mocking respective external dependencies is generated, as a by-product of symbolic execution on identification of the external dependencies. Each hint is representative of the call information, including but not limited to object type, method being called, return type, arguments with values and associated symbols. Further, an ideal return value of each of the one or more calls to external dependencies associated with respective paths is determined based on one or more conditional expressions associated with respective paths using one or more constraint solving techniques. Furthermore, each hint is updated with respective ideal return value. Finally, a unit test case for testing a selected class or method is generated by processing the hints with test data and an exclusion list.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
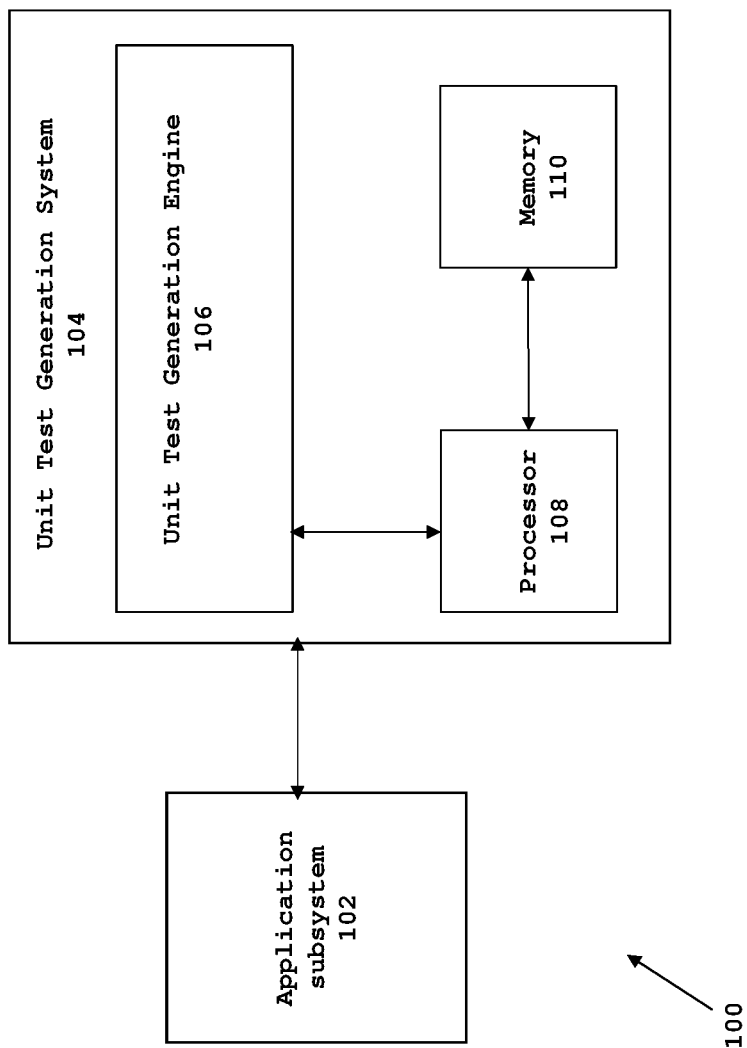
FIG. 1 illustrates a block diagram of an application development environment including a system for automated unit test case generation, in accordance with various embodiments of the present invention.

FIG. 1 illustrates a block diagram of an application development environment including a system for automated unit test case generation, in accordance with various embodiments of the present invention.

Referring to FIG. 1, in an embodiment of the present invention, the application development environment 100 comprises application subsystem 102 and the system for automated unit test case generation hereinafter referred to as a unit test generation system 104.

The application subsystem 102 includes a software application which may be in the development phase and has an application source code. In an exemplary embodiment of the present invention, the application subsystem 102 may be a hardware device. In another embodiment of the present invention, the application subsystem may be a software device or a combination of hardware and software. In an exemplary embodiment of the present invention the application subsystem is a combination of hardware and software and comprises a memory (not shown) to store the application source code and a processor (not shown) to execute instructions stored in the memory (not shown). The application source code includes one or more source files, where each source file comprises one or more program instructions. Further, the application source code comprises one or more classes including respective one or more methods. In an embodiment of the present invention, the one or more methods may be dependent on external objects to achieve its functionality. The application source code may be written in any of the programming languages such as C, C++, Java etc. in an exemplary embodiment of the present invention, as shown in FIG. 1, the application source code is written in Java. In various embodiments of the present invention, the application subsystem is configured to operate in a development environment 100. In an exemplary embodiment of the present invention, as shown in FIG. 1 the development environment may be Eclipse.

In an embodiment of the present invention, the unit test generation system 104 is configured to interface with the application subsystem 102. The unit test generation system 104 interfaces with the application subsystem 102 over a communication channel (not shown). Further, the communication channel (not shown) may include a physical transmission medium, such as, a wire, or a logical connection over a multiplexed medium, such as, a radio channel in telecommunications and computer networking. The examples of radio channel in telecommunications and computer networking may include, but are not limited to a Local Area Network (LAN), a Metropolitan Area Network (MAN), and a Wide Area Network (WAN).

Further, the unit test generation system 104 comprises a unit test generation engine 106, a processor 108 and a memory 110. The unit test generation engine 106 is configured to automatically analyze and extract data from application source code, identify executable paths, create and update hints for anticipating and mocking external dependencies, and generate unit test cases using updated hints.

In an embodiment of the present invention, the unit test generation engine 106 is configured to analyze the application source code and generate a codebase extract. The codebase extract includes a class dependency graph and one or more abstract syntax graphs associated with the application source code. In particular, the one or more abstract syntax graphs are associated with the one or more source files comprised by the application source code. The unit test generation engine 106 stores the generated codebase extract in a repository (not shown) for future use. Further, the unit test generation engine 106 is configured to identify one or more potential executable paths within a selected class or method based on an analysis of the codebase extract. In operation, the unit test generation engine 106 is configured to retrieve the codebase extract from the repository on receiving a request for generation of a unit test for a selected class or method. The unit test generation engine 106 analyses the code base extract and identifies one or more potential executable paths within the selected method using a path solving technique.

In an embodiment of the present invention, the unit test generation engine 106, executes one or more statements associated with each of the one or more potential paths using a symbolic execution technique. The unit test generation engine 106 is configured to identify one or more calls to external dependencies associated with the respective paths from the execution of statement. In an exemplary embodiment of the present invention, the one or more calls to external dependencies may include, but are not limited to calls to other methods in the application source code, calls to external libraries, database queries, calls to web service etc.

In an embodiment of the present invention, the unit test generation engine 106 is configured to generate one or more hints as a by-product of symbolic execution on identifying calls to one or more external dependencies. The generated one or more hints facilitate spying and mocking of calls to respective external dependencies. Each hint is representative of the call information, including but not limited to object type, method being called, return type, arguments with values and associated symbols.

Further, the unit test generation engine 106 is configured to determine if the object type in one or more hints is associated with any of the following categories: an interface or an abstract class or a base class. If it is determined that the object type is in any of the following categories, the unit test generation engine 106 is configured to determine an accurate implementation for the object type.

In particular, during symbolic execution of the one or more statements, if it is determined that the object type is associated with the base class, then the unit test generation engine 106 uses type cast information associated with the object from a symbol table to identify the accurate implementation. Furthermore, during processing of the one or more generated hints as explained later in the specification, if it is determined that the object type is associated with an interface or an abstract class, the unit test generation engine 106 uses a predefined-list of possible implementations along with a reflection technique to identify the accurate implementation. The unit test generation engine 106 updates the generated one or more hints with the determined implementation.

In an embodiment of the present invention, the unit test generation engine 106 is configured to resolve one or more conditional expressions associated with each of the identified potential paths to determine an ideal return value of each of the one or more calls to external dependencies respectively. In particular, the unit test generation engine 106, determines an ideal return value of each of the one or more calls to external dependencies associated with respective paths by solving one or more conditional expressions associated with respective paths using one or more constraint solving techniques. Each ideal return value is representative of a value which should be returned by respective external call to make downstream execution of the respective path feasible. The unit test generation engine 106 updates each hint with respective ideal return value.

Finally, the unit test generation engine 106 is configured to generate a unit test case for testing the selected method or class by processing the hints with test data and an exclusion list.

In various embodiment of the present invention, the unit test generation system 104 may be implemented as a client-server architecture, wherein the application subsystem 102 accesses a server hosting the system 104 over a communication network.

In yet another embodiment of the present invention the unit test generation system 104 may be integrated with the application subsystem 102 as an abstract unit.

Figure 2:
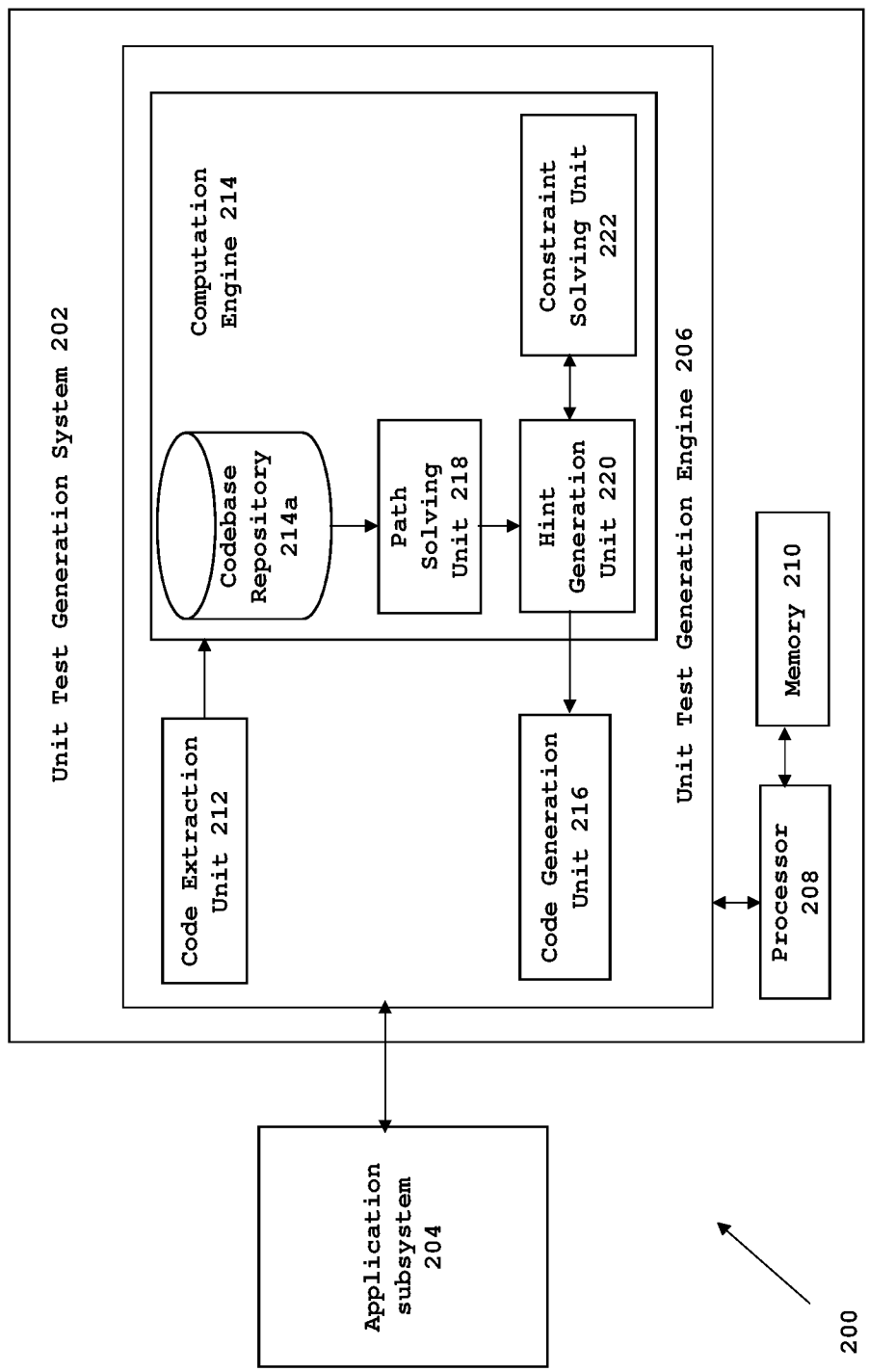
FIG. 2 is a detailed block diagram of a system for automating unit test case generation, in accordance with various embodiments of the present invention.

FIG. 2 is a detailed block diagram of a system for automating unit test case generation, in accordance with various embodiments of the present invention. The unit test generation system 202 interfaces with the application subsystem 204 to analyse and generate codebase extract. The unit test generation system 202 automatically identifies executable paths from generated codebase extract, creates and updates hints for anticipating and mocking external dependencies, and generates unit test cases using updated hints. The unit test generation system 202 comprises a unit test generation engine 206, a processor 208 and a memory 210.

In various embodiments of the present invention, the unit test generation engine 206 has multiple units which work in conjunction with each other for automated unit test generation. The various units of the unit test generation engine 206 are operated via the processor 208 specifically programmed to execute instructions stored in the memory 210 for executing respective functionalities of the units of the system 202 in accordance with various embodiments of the present invention.

In an embodiment of the present invention, the unit test generation engine 206 comprises a code extraction unit 212, a computation engine 214, a code base repository 214a and a code generation unit 216.

In an embodiments of the present invention, the code extraction unit 212 is configured to interface with the application subsystem 204. In an exemplary embodiment of the present invention, the code extraction unit 212 may be implemented as a plugin for the application subsystem 204 operating in a development environment.

The code extraction unit 212 is configured to analyze the application source code using static analysis of the application. An example of the application source code is shown in FIG. 3A. As already described above in para 22, the application source code includes one or more source files, where each source file comprises one or more program instructions. Further, the code extraction unit 212 generates a codebase extract by parsing the application source code. In an embodiment of the present invention, the codebase extract includes a class dependency graph and one or more abstract syntax graph associated with the application source code. In particular, the one or more abstract syntax graphs are associated with the one or more source files comprised by the application source code. The code extraction unit 212 stores the generated codebase extract in the codebase repository 214a.

In an embodiment of the present invention, the computation engine 214 is configured to retrieve the codebase extract, identify one or more executable paths from the generated codebase extract, create and update hints for anticipating and mocking external dependencies. The computation engine 214 comprises a path solving unit 218, a hint generation unit 220 and a constraint solving unit 222.

In an embodiment of the present invention, the path solving unit 218 is configured to retrieve the codebase extract from the codebase repository 214a on receiving a request for generation of a unit test for a selected class or method. In an exemplary embodiment of the present invention, the class or method may be selected by an end user via a user interface (not shown) of the application subsystem 204. The path solving unit 218 analyses the code base extract and identifies one or more potential executable paths within the selected method using a path solving technique. Further, the path solving unit 218 filters invalid or infeasible paths before sending the one or more identified paths for further processing.

In an embodiment of the present invention, the hint generation unit 220 receives the one or more potential paths from the path solving unit 218. The hint generation unit 220 is configured to execute one or more statements associated with each of the one or more potential paths using a symbolic execution technique. The hint generation unit 220 interprets each statement associated with respective one or more paths while continuously maintaining a symbol table. Each statement comprises one or more expressions, where an expression is a combination of one or more variables, constants, operators and functions. Further, the one or more statements may comprise one or more conditional expressions. The hint generation unit 220 is configured to execute each statement associated with each executable path. The hint generation unit 220 generates a record of each expression and each of the variables comprised by the expression in the symbol table. In an exemplary embodiment of the present invention, the symbol table is a customized data structure configured to store semantic information associated with, but not limited to, an expression, variables present in the expression, and the selected method. The semantic information may include, but is not limited to, scope, variable name, variable data type, associated symbol, value, format of the value, constraints, variable type, object type information, resolved data type of the variable, type cast information associated with the object, expression information such as if the expression is a null check expression, if the input of the selected method is resolved, etc. The variable type information includes literal, number, null or list. The object type information includes constructor type or unknown.

The hint generation unit 220 collects one or more conditional expressions associated with each of the one or more paths for constraint solving as explained later. In an exemplary embodiment of the present invention all the conditional expressions associated with a path are aggregated. Further, the hint generation unit 220 is configured to identify one or more calls to external dependencies associated with the respective paths from the execution of corresponding statements. In an embodiment of the present invention, the one or more calls to external dependencies may include, but are not limited to calls to other methods in the application source code, calls to external libraries, database queries, calls to web service etc. The hint generation unit 220 is configured to generate one or more hints for spying and mocking respective external dependency on the identification of the external dependency call.

In an exemplary embodiment of the present invention, a statement interpreted as method invocation is identified as a call to a dependency external to the method under test. The hint generation unit 220 updates the symbol table accordingly and generates a hint as a by-product of the execution of the statement. In particular, the hint generation unit 220 creates a record for the invoked method in the symbol table if a method invocation is detected. The record comprises information such as method qualified name, parameters with their data types, return type of the method, scope, classification associated with method type etc. The classification associated with the method type may include, but are not limited to the method is constructor, the method is unknown or belongs to an external library, etc. In an exemplary embodiment of the present invention, the method is marked as known if the source code of the method is accessible. The method is marked as unknown if the source code of the method is not accessible. Further, the hint generation unit 220 generates one or more hints using the record in the symbol table. Each hint is representative of the call information associated with respective external dependencies, including but not limited to object type, method being called, return type, arguments with values and associated symbols. In an exemplary embodiment of the present invention, the format of hints may be xml format, JSON format etc.

Further, the hint generation unit 220 is configured to determine if the object type in one or more hints is associated with any of the following predefined categories: an interface or an abstract class or a base class. If it is determined that the object type is in any of the predefined categories, the hint generation unit 220 is configured to determine an accurate implementation for the object type based on the predefined category. In particular, while symbolic execution of the one or more statements interpreted as external dependencies, if it is determined that the object type is associated with the base class, then the hint generation unit 220 uses type cast information associated with the object from a symbol table to identify the accurate implementation. Furthermore, while processing the one or more generated hints as explained later in the specification, if it is determined that the object type is associated with an interface or an abstract class, the hint generation unit 220 uses a predefined-list of possible implementations along with a reflection technique to identify the accurate implementation. The hint generation unit 220 updates the one or more generated hints with the determined implementation.

In an embodiment of the present invention, the constraint solving unit 222 is configured to receive aggregated conditional expressions associated with each of the one or more executable paths from the hint generation unit 220. The constraint solving unit 222 is configured to resolve one or more conditional expressions associated with each of the identified potential paths to determine an ideal return value of each of the one or more calls to external dependencies respectively. In particular, the constraint solving unit 222, determines an ideal return value of each of the one or more calls associated with respective paths by solving the aggregated conditional expressions associated with respective paths using one or more constraint solving techniques. Each ideal return value is representative of a value which is to be returned by respective external call such that downstream execution is feasible.

Further, the hint generation unit 220 is configured to receive the ideal return values from the constraint solving unit 222 and accordingly updates the symbol table. The hint generation unit 220 updates each hint with respective ideal return value.

In an embodiment of the present invention, the code generation unit 216 is configured to receive the updated hints and a test data generated during symbolic execution and constraint solving from the hint generation unit 220. Further, the code generation unit 216 is configured to receive an exclusion list from a database. In another embodiment of the present invention, the code generation unit 216 is configured to receive the exclusion list from an end user. In an exemplary embodiment of the present invention, the exclusion list comprises a pre-generated list of object types which are not to be mocked. For example, built-in library functions like math functions or type conversion functions need not be mocked. In operation, the code generation unit 216, performs a check to determine if the object type associated with respective hints against the exclusion list. If the object type is not found in the exclusion list, the code generation unit 216 creates an appropriate mock statement. Further, the code generation unit 216 generates a unit test case for testing the selected method or class by processing the hints with test data and an exclusion list.

Figure 3:
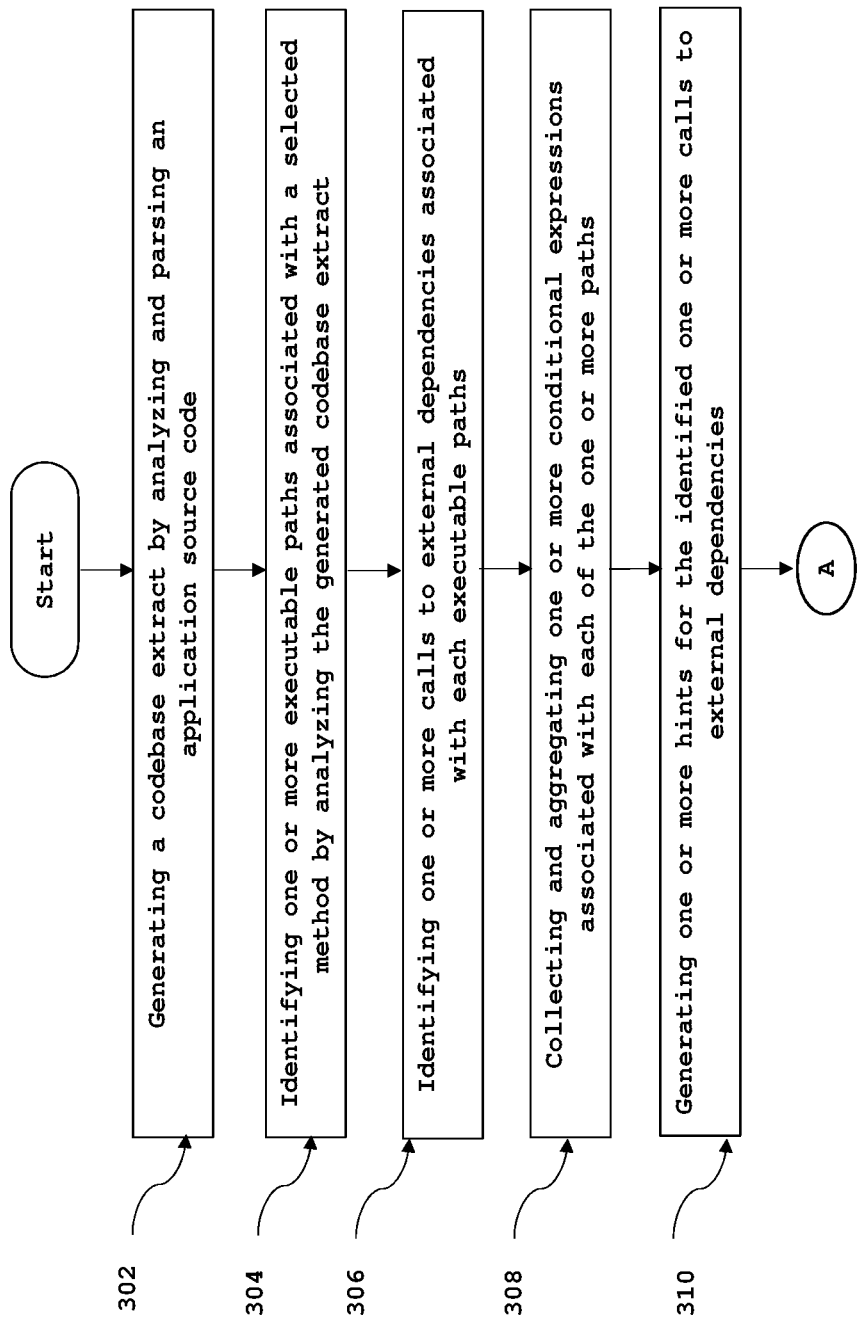
FIG. 3 is a flowchart illustrating a method for automating unit test case generation, in accordance with various embodiments of the present invention.
Figure 3:
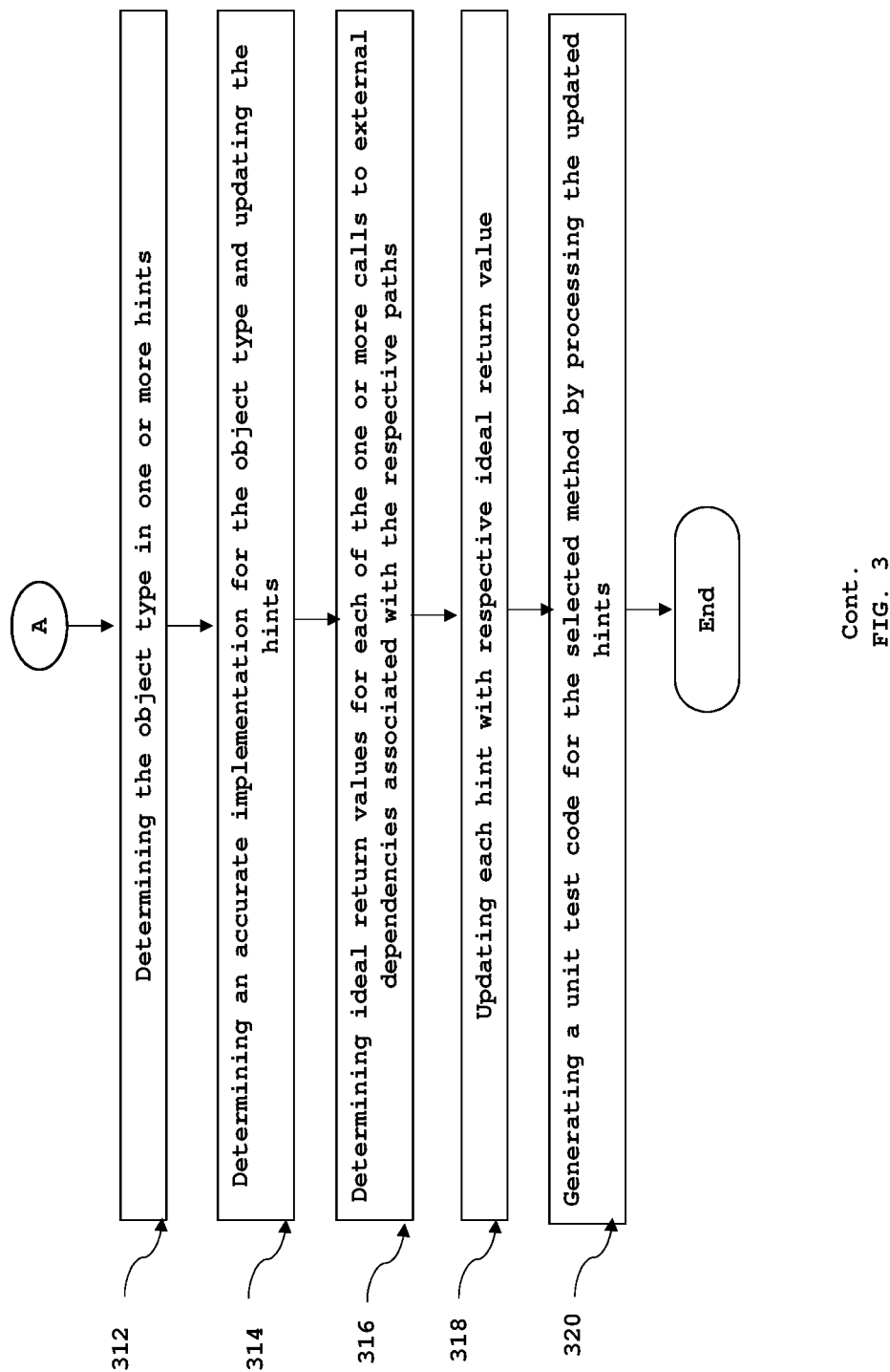

FIG. 3 is a flowchart illustrating a method for automating unit test case generation, in accordance with various embodiments of the present invention.

At step 302, a codebase extract is generated by analysing and parsing an application source code. In an embodiment of the present invention, the application source code is analyzed using static analysis. The application source code includes one or more source files, where each source file comprises one or more program instructions. Further, a codebase extract is generated by parsing the application source code. In an embodiment of the present invention, the codebase extract includes a class dependency graph and one or more abstract syntax graph associated with the application source code. In particular, the one or more abstract syntax graphs are associated with the one or more source files comprised by the application source code. The generated codebase extract is stored in a codebase repository.

At step 304, one or more executable paths associated with a selected method are identified by analyzing the generated codebase extract. In an embodiment of the present invention, the codebase extract is retrieved on receiving a request for generation of a unit test for the selected method. The code base extract is analyzed and one or more potential executable paths within the selected method are identified using a path solving technique. Further, invalid or infeasible paths are filtered before further processing.

At step 306, one or more calls to external dependencies associated with each executable paths are identified. In an embodiment of the present invention, one or more statements associated with each of the one or more potential paths are executed using a symbolic execution technique. A symbol table is continuously maintained while interpreting each statement associated with respective one or more paths. Each statement comprises one or more expressions, where an expression is a combination of one or more variables, constants, operators and functions. Further, the one or more statements may comprise one or more conditional expressions. Each statement associated with each executable path is executed. A record of each expression and each of the variables comprised by the expression is created in the symbol table.

In an exemplary embodiment of the present invention, the symbol table is a customized data structure configured to store semantic information associated with, but not limited to, an expression, variables present in the expression, and the selected method. The semantic information may include, but is not limited to, scope, variable name, variable data type, associated symbol, value, format of the value, constraints, variable type, object type information, resolved data type of the variable, type cast information associated with the object, expression information such as if the expression is a null check expression, if the input of the selected method is resolved, etc. The variable type information includes literal, number, null or list. The object type information includes constructor type or unknown. Further, one or more calls to external dependencies associated with the respective paths from the execution of corresponding statements are identified. In an embodiment of the present invention, the one or more calls to external dependencies may include, but are not limited to calls to other methods in the application source code, calls to external libraries, database queries, calls to web service etc. In an exemplary embodiment of the present invention, a statement interpreted as method invocation is identified as a call to external dependency.

At step 308, one or more conditional expressions associated with each of the one or more paths are collected and aggregated. In an embodiment of the present invention, one or more conditional expressions associated with each of the one or more paths are collected for constraint solving as explained later. Further, all the conditional expressions associated with a path are aggregated.

At step 310, one or more hints for the identified one or more calls to external dependencies are generated. In an embodiment of the present invention, one or more hints for spying and mocking respective external dependency are generated on identification of the external dependency call. In particular, a hint is generated as a by-product of execution of the statement interpreted as external dependency. Each hint is representative of the call information, including but not limited to object type, method being called, return type, arguments with values and associated symbols. In an exemplary embodiment of the present invention, the format of hints may be xml format, JSON format etc.

At step 312, the object type in one or more hints is determined. In particular, it is determined if the object type is associated with any of the following predefined categories: an interface or an abstract class or a base class.

At step 314, an accurate implementation for the object type is determined and the hints are updated, if the object type is included in any of the predefined categories. In particular, while symbolic execution of the one or more statements interpreted as external dependencies, if it is determined that the object type is associated with the base class, the accurate implementation for the object type is identified using type cast information associated with the object from the symbol table. Furthermore, while processing the one or more generated hints, if it is determined that the object type is associated with an interface or an abstract class, the accurate implementation for the object type is identified using a predefined-list of possible implementations along with a reflection technique.

At step 316, ideal return values for each of the one or more calls to external dependencies associated with the respective paths is determined. In an embodiment of the present invention, one or more conditional expressions associated with each of the identified potential paths are resolved to determine an ideal return value of each of the one or more calls to external dependencies respectively. In particular, an ideal return value of each of the one or more calls associated with respective paths is determined based on the aggregated conditional expressions associated with respective paths using one or more constraint solving techniques. Each ideal return value is representative of a value which is to be returned by respective external call such that downstream execution is feasible. At step 318, each hint is updated with respective ideal return value.

At step 320, a unit test code is generated for the selected method by processing the updated hints. In an embodiment of the present invention, a unit test case for testing the selected method or class is generated by processing the hints with test data and an exclusion list. The test data is generated using symbolic execution and constraint solving of the statements and expressions. In an exemplary embodiment of the present invention, the exclusion list comprises a pre-generated list of object types which are not to be mocked. For example, built-in library functions like math functions or type conversion functions need not be mocked. In operation, it is determined if the object type associated with respective hints is present in the exclusion list. If the object type is not found in the exclusion list, an appropriate mock statement generated.

FIG. 3A shows an example of the application source code. The application source code comprises a method namely save( ) The method save ( ) includes two input parameters—visit and dataSource, of type Visit and DataSource respectively and has two executable paths. Each path is executed separately.

The symbolic execution starts from processing method signature, i.e. statement 3 and assumes symbols for visit and dataSource.

Further, statement 5 of the application source code is object instantiation for SimpleJdbcInsert class which is outside the scope of method under test. Hence, when statement 5 is processed, a symbol for insertVisit object is assumed and a hint as shown in FIG. 3B is generated.

Similarly, all statements in the method are executed and respective hints for each method call are generated. As shown in FIG. 3B the generated hints are collected in an xml format.

FIG. 3C shows a comparison between a unit test generated in accordance with various embodiments of the present invention and a unit test generated using conventional methods.

FIG. 3D shows a comparison between code coverage achieved using the unit test generated in accordance with various embodiments of the present invention and the code coverage achieved using unit test generated in accordance with conventional methods. As shown in the FIG. 3D rectangle with solid border is representative of completely covered lines, rectangle with dashed border is representative of partially covered lines and rectangle with rounded corners is representative of lines which are not executed. The number of lines included in rectangle with solid border using the unit test generated in accordance with the present invention are more than the number of lines in rectangle with solid border using the unit test generated using conventional methods. Therefore, as illustrated in FIG. 3D, the unit test generated in accordance with the present invention provides better code coverage vis-à-vis known methods.

Figure 4:
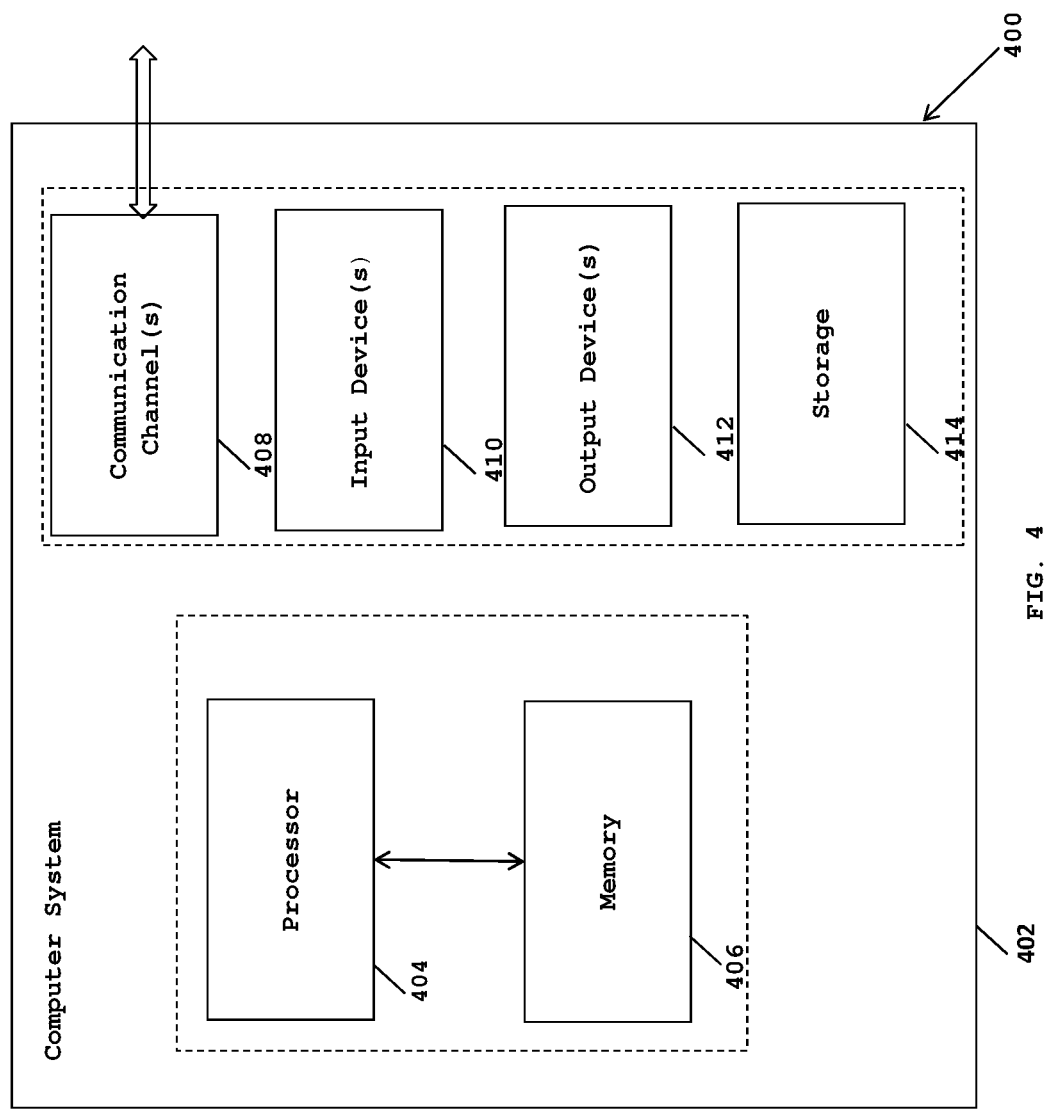
FIG. 4 illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various software executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded into a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A computer implemented method for automating unit test case generation for one or more methods associated with an application source code, wherein the method is implemented by a processor executing program instructions stored in a memory, the method comprising:
   identifying, by the processor, one or more potential executable paths associated with a selected method by analyzing a code base extract using a path solving technique;
   identifying, by the processor, one or more calls to external dependencies associated with each of the one or more potential executable paths using a symbolic execution technique;
   generating, by the processor, one or more hints for the identified one or more calls to external dependencies, wherein each hint is representative of call information associated with the external dependencies;
   updating, by the processor, the one or more hints with accurate implementations of an object type in each of the one or more hints, wherein the accurate implementation of each object type is identified based on determination of a predefined category associated with the object type from amongst predefined categories, wherein the predefined categories associated with the object type include an interface, an abstract class and a base class, wherein further accurate implementation for the object type associated with the base class is identified using type cast information associated with the object from the symbol table, and accurate implementation for the object type associated with the interface or the abstract class is identified using a predefined-list of possible implementations along with a reflection technique;
   updating, by the processor, each of the one or more hints with respective ideal return value, wherein the ideal return value of each of the one or more calls to external dependencies is determined based on an aggregated conditional expression associated with respective paths using one or more constraint solving techniques; and
   generating, by the processor, a unit test code for the selected method by processing the one or more hints with a test data and an exclusion list.

2. The method as claimed in claim 1, wherein the codebase extract is generated by analyzing and parsing the application source code, further wherein the codebase extract includes a class dependency graph and one or more abstract syntax graphs associated with the application source code.

3. The method as claimed in claim 1, wherein the code base extract is analysed for identifying one or more potential executable paths on receiving a request for generation of unit test for the selected method.

4. The method as claimed in claim 1, wherein identifying one or more calls to external dependencies comprises executing one or more statements associated with each of the one or more potential paths using a symbolic execution technique; creating and updating a symbol table while interpreting each statement associated with the respective one or more paths; and identifying a statement interpreted as method invocation as a call to external dependency, wherein the hint is generated as a by-product of execution of the statement interpreted as external dependency.

5. The method as claimed in claim 1, wherein the one or more calls to external dependencies include calls to other methods in the application source code, calls to external libraries, database queries and calls to web service.

6. The method as claimed in claim 4, wherein the symbol table is a customized data structure configured to store semantic information associated with an expression, variables present in the expression, and the one or more methods associated with application source code, wherein further the semantic information includes scope, variable name, variable data type, associated symbol, value, format of the value, constraints, variable type, object type information, resolved data type of the variable, type cast information associated with the object type information, or expression information.

7. The method as claimed in claim 1, wherein one or more conditional expressions associated with each of the one or more potential executable paths are collected and aggregated.

8. The method as claimed in claim 1, wherein the call information associated with the external dependency includes object type, method being called, return type, arguments with values and associated symbols.

9. The method as claimed in claim 1, wherein each ideal return value is representative of a value which is to be returned by respective external call such that downstream execution of respective path is feasible.

10. The method as claimed in claim 1, wherein the exclusion list comprises a pre-generated list of object types which are not to be mocked, wherein further processing of the one or more hints with the exclusion list comprises determining if the object type associated with one or more hints is associated with the exclusion list.

11. A system for automating unit test case generation for one or more methods associated with an application source code, wherein the system interfaces with an application subsystem comprising the application source code, the system comprising:

a memory storing program instructions; a processor configured to execute the program instructions stored in the memory; and a unit test generation engine in communication with the processor configured to:

identify one or more potential executable paths associated with a selected method by analysing a code base extract using a path solving technique;

identify one or more calls to external dependencies associated with each of the one or more potential executable paths using a symbolic execution technique;

generate one or more hints for the identified one or more calls to external dependencies, wherein each hint is representative of call information associated with the external dependencies;

update one or more hints with respective accurate implementations of an object type in each of the one or more hints, wherein the accurate implementation of each object type is identified based on determination of a predefined category associated with the object type from amongst predefined categories, wherein the predefined categories associated with the object type include an interface, an abstract class and a base class, wherein further accurate implementation for the object type associated with the base class is identified using type cast information associated with the object from the symbol table, and accurate implementation for the object type associated with the interface or the abstract class is identified using a predefined-list of possible implementations along with a reflection technique;

update each of the one or more hints with respective ideal return value, wherein the ideal return value of each of the one or more calls to external dependencies is determined based on an aggregated conditional expression associated with respective paths using one or more constraint solving techniques; and generate a unit test code for the selected method by processing the one or more hints with a test data and an exclusion list.

12. The system as claimed in claim 11, wherein the unit test generation engine comprises a code extraction unit in communication with the processor, the code extraction unit configured to generate a codebase extract by analysing the application source code using static analysis and parsing the analysed application source code, further wherein the codebase extract includes a class dependency graph and one or more abstract syntax graphs associated with the application source code.

13. The system as claimed in claim 11, wherein the unit test generation engine comprises a computation engine in communication with the processor, the computation engine comprises a path solving unit configured to: analyse the codebase extract on receiving a request for generation of unit test for the selected method; identify one or more potential executable paths within the selected method using the path solving technique; and filter invalid or infeasible paths before transmitting for further processing.

14. The system as claimed in claim 13, wherein the computation engine comprises a hint generation unit configured to: execute one or more statements associated with each of the one or more potential paths using a symbolic execution technique; create and update a symbol table while interpreting each statement associated with respective one or more paths; and identify a statement interpreted as method invocation as a call to external dependency, wherein the hint is generated as a by-product of execution of the statement interpreted as external dependency.

15. The system as claimed in claim 14, wherein the hint generation unit is configured to collect one or more conditional expressions associated with each of the one or more paths; and aggregate the one or more conditional expressions associated with each path respectively.

16. The system as claimed in claim 11, wherein the one or more calls to external dependencies include calls to other methods associated with the application source code, calls to external libraries, database queries and calls to web service.

17. The system as claimed in claim 14, wherein the symbol table is a customized data structure configured to store semantic information associated with an expression, variables present in the expression, and the one or more methods associated with application source code, wherein further the semantic information includes scope, variable name, variable data type, associated symbol, value, format of the value, constraints, variable type including literal, number, null or list, object type information, resolved data type of the variable, type cast information associated with the object type information, or expression information.

18. The system as claimed in claim 11, wherein the call information associated with the external dependency includes object type, method being called, return type, arguments with values and associated symbols.

19. The system as claimed in claim 11, wherein a format of the one or more hints is selected from xml and JSON.

20. The system as claimed in claim 11, wherein each ideal return value is representative of a value which is to be returned by respective external call such that downstream execution of the respective path is feasible.

21. The system as claimed in claim 11, wherein the exclusion list comprises a pre-generated list of object types which are not to be mocked.

22. The system as claimed in claim 11, wherein the unit test generation engine comprises a code generation unit in communication with the processor, the code generation unit configured to: determine if the object type associated with respective hints are included in the exclusion list; create appropriate mock statement, if the object type is not found in the exclusion list; and generate the unit test case for the selected method by processing the one or more hints with test data and the exclusion list.

23. A computer program product comprising:

a non-transitory computer-readable medium having computer-readable program code stored thereon, the computer-readable program code comprising instructions that, when executed by a processor, cause the processor to:

identify one or more potential executable paths associated with a selected method by analysing a code base extract using a path solving technique;

identify one or more calls to external dependencies associated with each of the one or more potential executable paths using a symbolic execution technique;

generate one or more hints for the identified one or more calls to external dependencies, wherein each hint is representative of call information associated with the external dependencies;

update the one or more hints with accurate implementations of an object type in each of the one or more hints, wherein the accurate implementation of each object type is identified based on determination of a predefined category associated with the object type from amongst predefined categories, wherein the predefined categories associated with the object type include an interface, an abstract class and a base class, wherein further accurate implementation for the object type associated with the base class is identified using type cast information associated with the object from the symbol table, and accurate implementation for the object type associated with the interface or the abstract class is identified using a predefined-list of possible implementations along with a reflection technique;

update each of the one or more hints with respective ideal return value, wherein the ideal return value of each of the one or more calls to external dependencies is determined based on an aggregated conditional expression associated with respective paths using one or more constraint solving techniques; and generate a unit test code for the selected method by processing the one or more hints with a test data and an exclusion list.

* * * * *